US007002304B2

(12) United States Patent
Chan et al.

(10) Patent No.: US 7,002,304 B2
(45) Date of Patent: Feb. 21, 2006

(54) MULTI-LAMP DRIVE DEVICE

(75) Inventors: Chun-Kong Chan, Hsi Chih (TW); Jeng-Shong Wang, Hsin Chuang (TW)

(73) Assignee: Lien Chang Electronic Enterprise Co., Ltd., Taipei (TW)

( * ) Notice: Subject to any disclaimer, the term of this patent is extended or adjusted under 35 U.S.C. 154(b) by 28 days.

(21) Appl. No.: 10/749,506

(22) Filed: Jan. 2, 2004

(65) Prior Publication Data

US 2005/0146286 A1 Jul. 7, 2005

(51) Int. Cl.
*H05B 41/16* (2006.01)
*H02M 3/335* (2006.01)
*G05B 24/02* (2006.01)

(52) U.S. Cl. ...................... 315/282; 315/279; 315/291; 315/312; 363/21.02; 363/21.01; 323/344; 323/328

(58) Field of Classification Search ................ 315/282, 315/279, 276, 291, 307, 312, 324; 363/21.02, 363/21.01, 21.11, 21.04; 323/344, 328, 334, 323/356, 357, 355
See application file for complete search history.

(56) References Cited

U.S. PATENT DOCUMENTS 4,187,450 A * 2/1980 Chen .......................... 315/278
4,858,093 A * 8/1989 Sturgeon ..................... 363/20
4,864,478 A * 9/1989 Bloom ........................ 363/16
5,036,255 A * 7/1991 McKnight et al. .......... 315/258
6,717,372 B1 * 4/2004 Lin et al. .................... 315/282
2005/0023998 A1 * 2/2005 Lee ............................ 315/312

* cited by examiner

*Primary Examiner*—Tuyet Thi Vo
(74) *Attorney, Agent, or Firm*—Rosenberg, Klein & Lee

(57) ABSTRACT

A multi-lamp drive device comprises a transformer, a drive circuit and at least a balanced inductor. The magnetic core of the transformer has a first side column, a second side column and at least a central column. A primary coil and a secondary coil are wound around the first side column and the second side column, respectively. The drive circuit can output an excitation power source to the transformer for driving lamps to be on based on the energy conversion characteristic of the transformer. With the help of the central column, the transformer can guide the counter magnetic flux generated by the load current without interfering the power conversion action of the transformer. Moreover, heat generated by the transformer due to a too larger load current can be reduced, and the protection function for the transformer during short circuit can also be accomplished.

16 Claims, 9 Drawing Sheets

MULTI-LAMP DRIVE DEVICE

FIELD OF THE INVENTION

The present invention relates to a multi-lamp drive device and, more particularly, to a transformer used for driving cold cathode fluorescent lamps and a multi-lamp drive device having this kind of transformer.

BACKGROUND OF THE INVENTION

Cold cathode fluorescent lamps (CCFLs) are used as the light source of a backlight system in an LCD panel. These CCFLs are driven by a drive circuit called an inverter. Because of technique progresses and consumer demands, the size of LCD panels increases continually. A single lamp can't meet the requirement for illumination of LCD panel. Two or more lamps are required instead.

As shown in FIG. 1, a primary coil 42 and a secondary coil 43 are both wound around a central column 401 of a transformer 40 used in a conventional multi-lamp drive device. The primary coil 42 is connected with a drive circuit 47. When the drive circuit 47 generates an excitation power source, an excitation current will flow on the primary coil 42 to produce magnetic flux in the central column. The magnetic flux flows through a first side column 402 and a second side column 403 and then back to the central column 401. The magnetic flux can thus be coupled with the secondary coil 43 to generate an induced voltage for driving CCFLs 46 connected to the secondary coil 43 to be on. Ballast components 48 having a high impedance are connected with the CCFLs 46 to balance the currents flowing through the CCFLs 46. Balanced inductors 43 can be used to compensate the capacitance impedance of the CCFLs 46 for balance of the output powers.

Because the primary coil 42 and the secondary coil 43 of the transformer 40 are both wound around the central column 401, they use the same magnetic circuit (the central column 401) to cause increase of the mutual inductance. When the transformer 40 drives multiple lamps, a very large load current will be produced on the secondary coil 43. This load current will induce a very large counter magnetomotive force to affect the power conversion action of the primary coil 42 and also generate large heat on the primary coil 42. If the secondary coil 43 is short circuited due to some factors, the drive circuit 47 and the primary coil 42 will be burned out.

As shown in FIG. 2, a primary coil 52 and a secondary coil 54 are both wound around a first side column 501 and a second side column 503 of a transformer 50 used in another conventional multi-lamp drive device, respectively. When the primary coil 52 accepts an excitation power source from a drive circuit 47, magnetic flux will be generated in the first side column 501 and flows to the second side column 503 and then back to the first side column 501. The magnetic flux can thus be coupled with the secondary coil 54 to generate an induced voltage for driving CCFLs 46 connected to the secondary coil 54 to be on. Ballast components 48 having a high impedance are connected with the CCFLs 46 to balance the currents flowing through the CCFLs 46. Balanced inductors 43 can be used to compensate the capacitance impedance of the CCFLs 46 for balance of the output powers.

Because the primary coil 52 and the secondary coil 54 of the transformer 50 are wound around the first side column 501 and the second side column 503, respectively, they also use the same magnetic circuit to cause increase of the mutual inductance. When the transformer 50 drives multiple lamps, a very large load current will be produced on the secondary coil 54. This load current will induce a very large counter magnetomotive force to affect the power conversion action of the primary coil 52 and also generate large heat on the primary coil 52. If the secondary coil 54 is short circuited due to some factors, the drive circuit 47 and the primary coil 52 will be burned out.

Along with increase of the number of lamps, the required power rises to increase burdens to the drive circuit and the transformer. Large heat will thus be generated by the transformer to affect its function. Moreover, because the primary coil is subject to the interference from the secondary coil, normal function of the transformer will be affected. If the secondary coil of the transformer is short circuited due to some factors, the primary coil will be burned out due to a very large counter magnetomotive force induced by the short-circuit current.

Accordingly, the present invention aims to propose a multi-lamp drive device, which reduces the heat generated by a transformer due to a too large load current and also accomplishes the protection effect for the transformer during short circuit by arranging positions of winding coils of the transformer when driving multiple lamps. Moreover, the primary coil won't be affected due to load change of the secondary coil.

SUMMARY OF THE INVENTION

An object of the present invention is to provide a multi-lamp drive device, wherein a primary coil and a secondary coil of a transformer are wound around two side columns of a magnetic core, respectively. At least a central column is arranged between the two side columns. With the help of the central column, the counter magnetomotive force generated by the primary coil can be lowered to protect the primary coil and also reduce heat generated by the transformer.

The various objects and advantages of the present invention will be more readily understood from the following detailed description when read in conjunction with the appended drawings, in which:

DETAILED DESCRIPTION OF THE PREFERRED EMBODIMENTS

Figure 1:
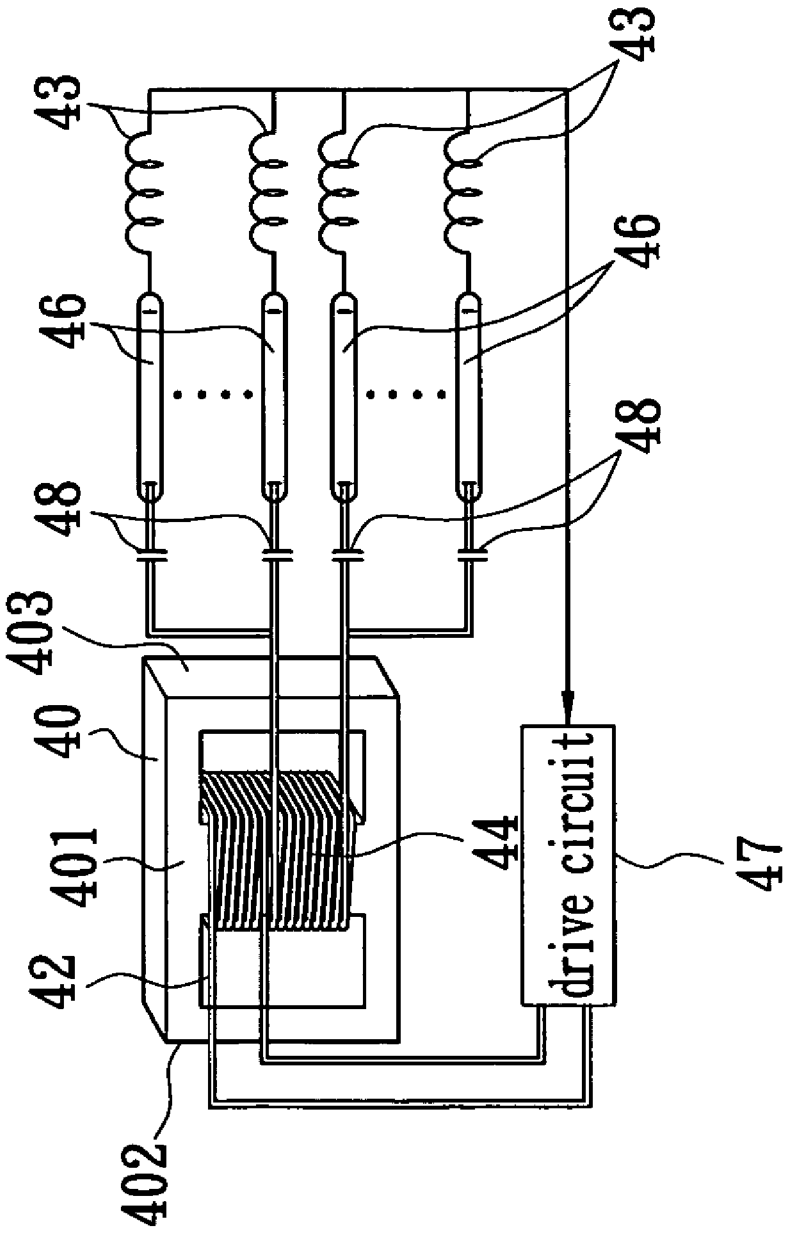
FIG. 1 PRIOR ART
FIG. 1 is a wiring block diagram of a conventional multi-lamp drive device.
Figure 2:
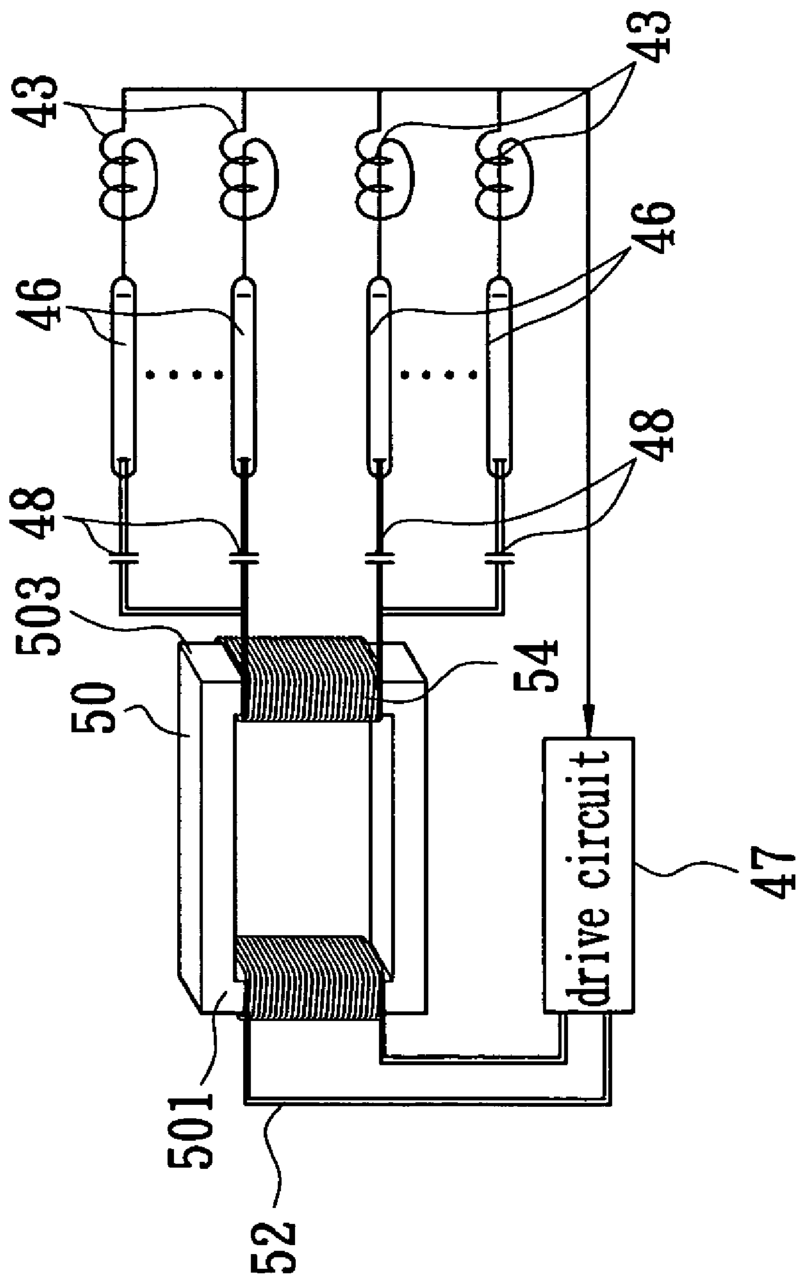
FIG. 2 PRIOR ART
FIG. 2 is a wiring block diagram of another conventional multi-lamp drive device.
Figure 3:
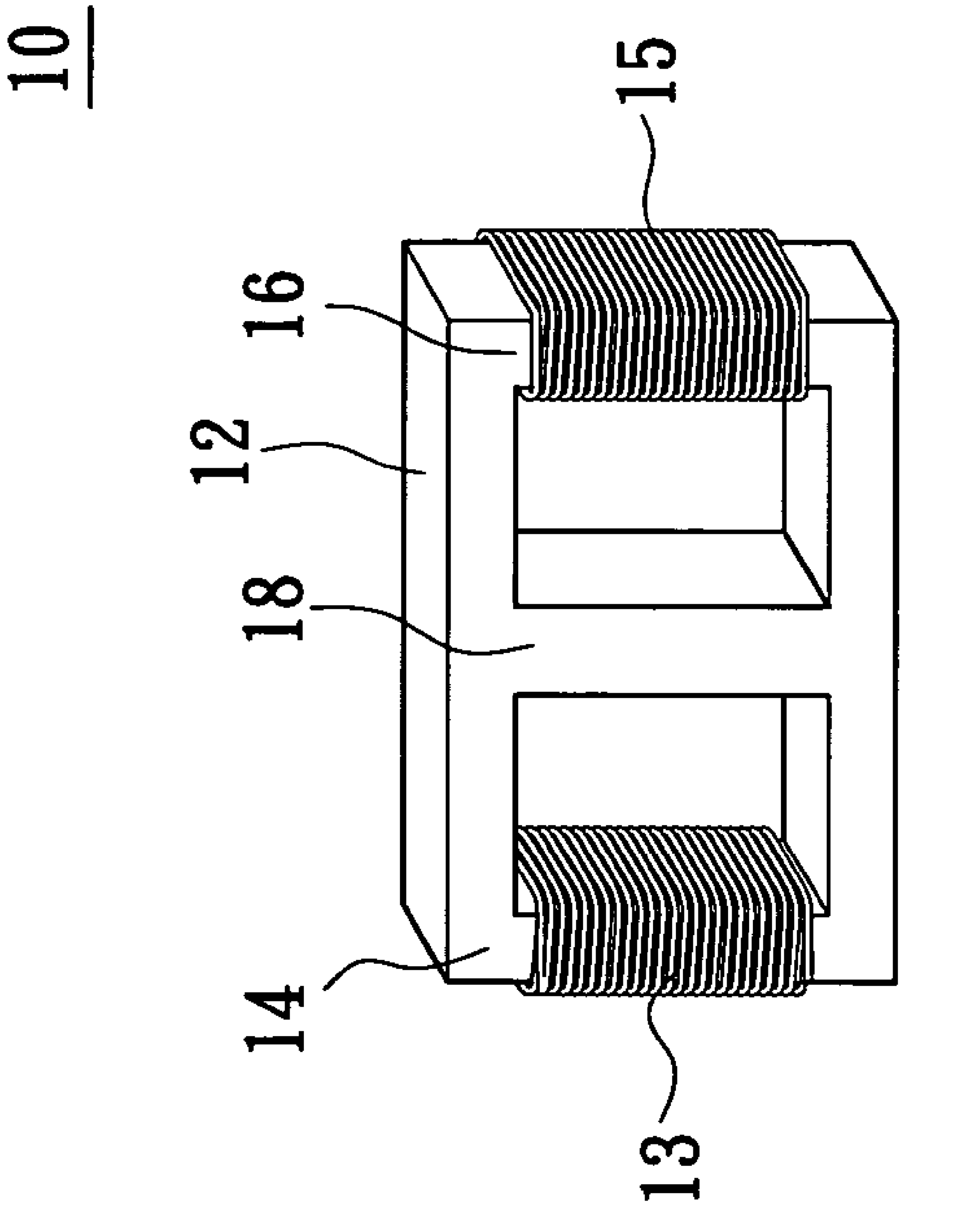
FIG. 3 is a perspective view of a transformer of a multi-lamp drive device according to a first embodiment of the present invention.

As shown in FIG. 3, a magnetic core 12 of a transformer 10 has a first side column 14 and a second side column 16. At least a central column 18 is arranged between the first side column 14 and the second side column 16. A primary coil 13 is wound around the first side column 14, and is electrically coupled to an excitation power source. A secondary coil 15 is wound around the second side column 16, and is electrically coupled to at least a lamp.

Please refer to FIG. 3 again. The magnetic core 12 of the transformer 10 can be composed of two E-shaped magnetic cores, and can be composed of an E-shaped magnetic core and an I-shaped magnetic core, and can also be composed of two inverse U-shaped magnetic cores and two L-shaped magnetic cores. If the magnetic core 12 has more than two central columns 18, the magnetic core 12 can be assembled by magnetic cores of various letters according to its shape.

Figure 4:
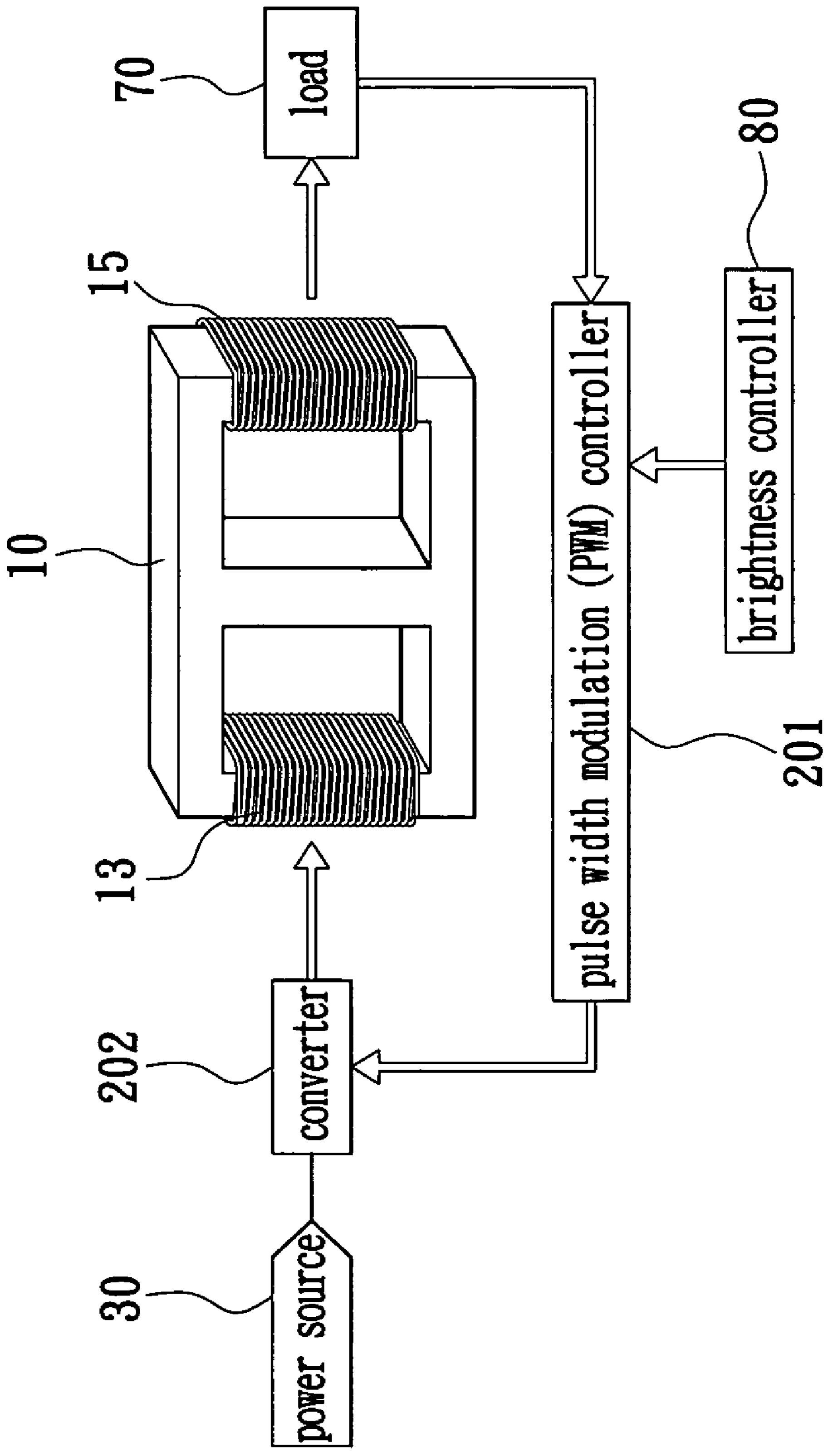
FIG. 4 is an architecture diagram of a multi-lamp drive device according to the first embodiment of the present invention.

As shown in FIG. 4, the primary coil 13 of the transformer 10 is connected to a converter 202, the secondary coil 15 is connected to a load 70, and a pulse width modulation (PWM) controller 201 is connected between the load 70 and the converter 202. The PWM controller 201 is used to receive a feedback signal from the load 70 and then control and drive the converter 202 according to the feedback signal. The converter 202 is powered by a power source 30, and outputs an excitation power source to the transformer for driving the load 70. A brightness controller 80 is further connected to the PWM controller 201, and outputs a voltage or a digital signal to control the PWM controller 201 for changing the brightness of the load 70.

The above converter 202 is a flyback transformer, a forward converter, a push-pull converter, a half-bridge converter, a bidirectional converter, or a full-bridge converter.

Figure 5:
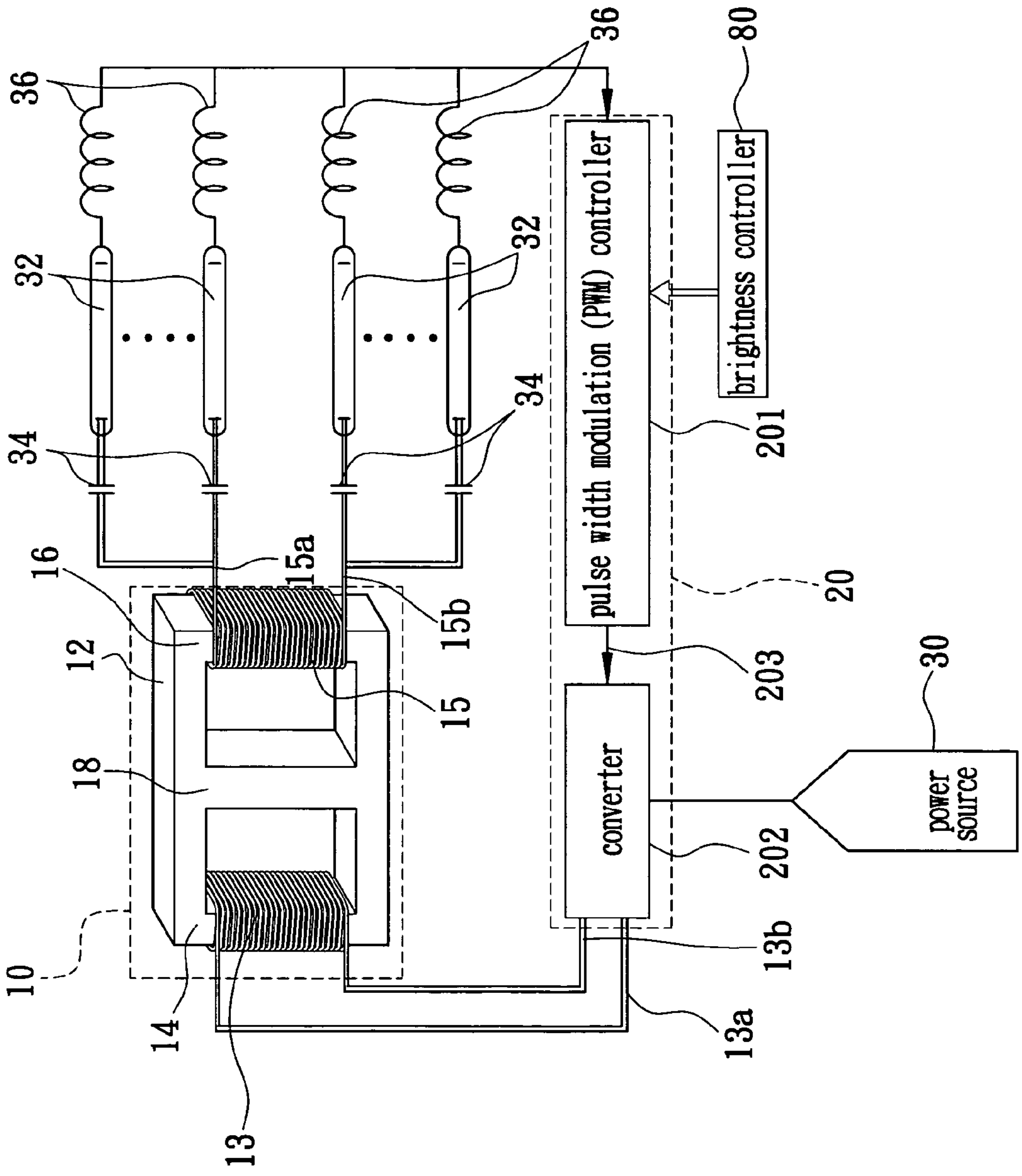
FIG. 5 is a circuit block diagram of a multi-lamp drive device according to the first embodiment of the present invention.

Because there are many types of the above converter 202, the first embodiment is exemplified with a full-bridge converter. As shown in FIG. 5, a multi-lamp drive device is connected with a power source for driving at least a cold cathode fluorescent lamp (CCFL) 32 to emit light. The multilamp drive device comprises a transformer 10 having a central column (shown in FIG. 3), a drive circuit 20, at least a ballast component 34, and at least a balanced inductor 36. The drive circuit 20 is formed by connecting a PWM controller 201 with a converter 202. Two ends 13*a* and 13*b* of the primary coil 13 of the transformer 10 are connected to the converter 202, and two ends 15*a* and 15*b* of the secondary coil 15 are electrically coupled to one end of the ballast component 34, respectively. The other end of the ballast component 34 is connected in order with the CCFL 32 and the balanced inductor 36. One end of the balanced inductor 36 is connected to the PWM controller 201 of the drive circuit 20. A brightness controller 80 is connected to the PWM controller 201, and outputs a voltage or a digital signal to control the PWM controller 201 for changing the brightness of the CCFL 32.

The above ballast component 34 is a capacitor having a higher impedance than the CCFL 32 to balance the load current. The above balanced inductor can be replaced with a winding coil of a balanced transformer, and can be moved to be between the ballast component 34 and the CCFL 32. Meanwhile, the other end of the CCFL 32 is connected to the PWM controller 201 of the drive circuit 20. The balanced inductor 36 can thus compensate the capacitance impedance of the CCFL 32.

Please refer to FIG. 5 again. The PWM controller 201 receives the load current from the balanced inductor 36 and then outputs a modulation signal 203 to the converter 202 for controlling the switching action of the converter 202. Based on the power source 30, the converter 202 outputs an excitation power source to the two ends 13*a* and 13*b* of the primary coil 13 of the transformer 10. Magnetic flux will be generated in the first side column 14, and flows to the central column 18 and the second side column 16 along the magnetic circuit in the magnetic core 12 and then back to the first side column 14. The magnetic flux can thus be coupled to the secondary coil 15 to produce an induced voltage at the two ends 15*a* and 15*b* of the secondary coil 15. This induced voltage is used to drive the CCFL 32 to emit light.

Please refer to FIG. 5 again. When the transformer 10 is used to drive the CCFL 32 to emit light, there will be a load current flowing in the secondary coil 15. This load current will produce a counter magnetic flux in the second side column 16. This counter magnetic flux will flow to the central column 18 and then back to the second side column 16 due to the magnetic flux in the first side column 15. Therefore, this counter magnetic flux won't generate a counter magnetomotive force on the primary coil 13 to affect the power conversion action of the primary coil 13 on the first side column 14. Moreover, when the transformer 10 is used to drive the CCFL 32 to emit light, the waking temperature of the transformer 10 won't rise due to the load of the CCFL 32.

As shown in FIG. 5, when the secondary coil 15 of the transformer 10 is short circuited due to some factors, a very large short circuit current will be instantaneously generated in the secondary coil 15. This short circuit current will generate a very large counter magnetic flux in the second side column 16. This counter magnetic flux will flow to the central column 18 and then back to the second side column 16 due to the magnetic flux on the first side column 14. Therefore, this counter magnetic flux won't generate a very large counter magnetomotive force on the primary coil 13 to burn out the primary coil 13. Moreover, the power conversion action of the primary coil 13 on the first side column 14 won't be affected, and the protection function for the transformer 10 during short circuit can also be accomplished.

Figure 6:
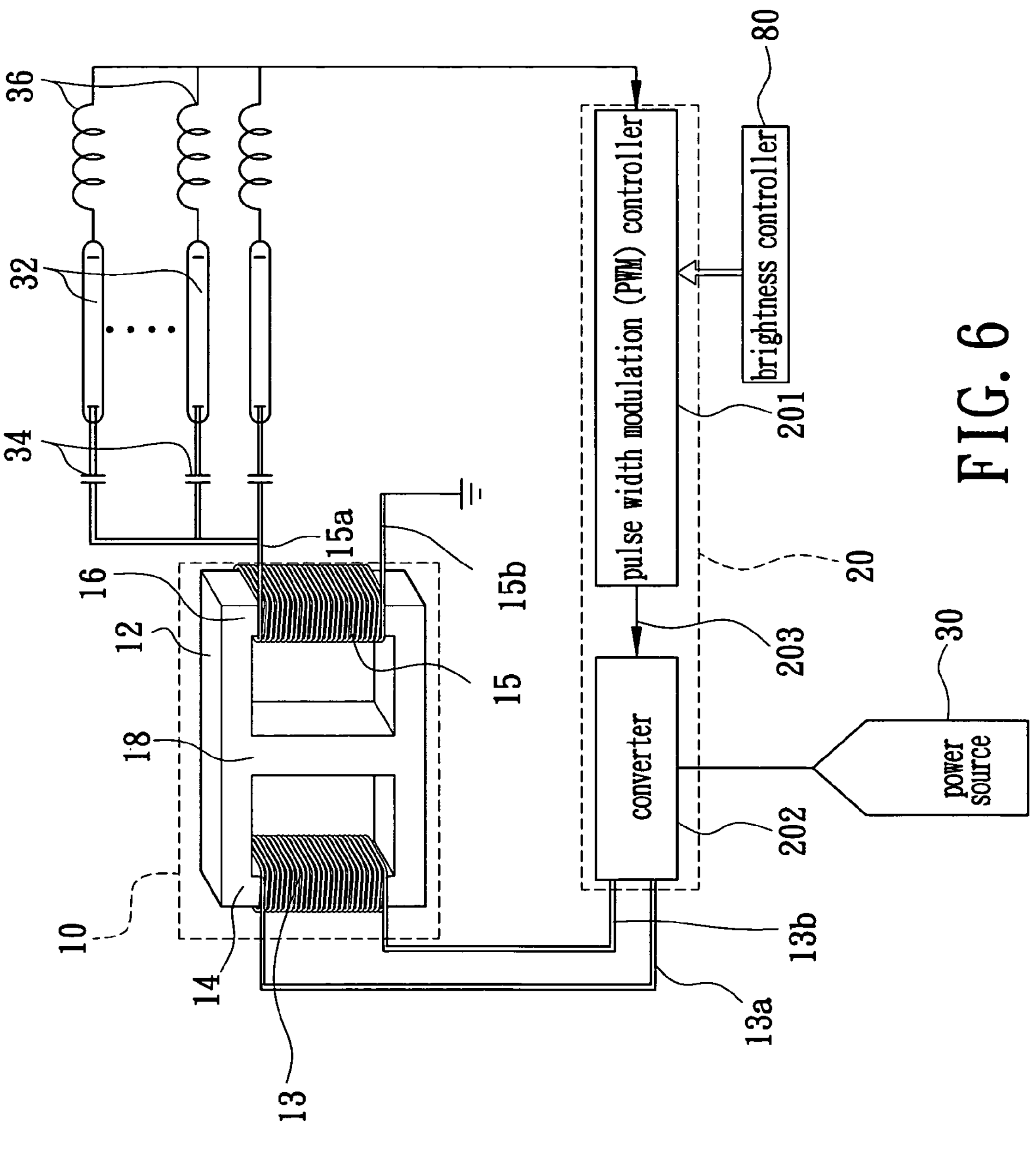
FIG. 6 is another block diagram of a multi-lamp drive device according to the first embodiment of the present invention.

FIG. 6 differs from FIG. 5 only in the arrangement of the CCFL 32 connected to the two ends 15*a* and 15*b* of the secondary coil 15. In FIG. 6, one of the two ends 15*a* and 15*b* of the secondary coil 15 is electrically coupled to one end of at least a ballast component 34, and the other of the two ends 15*a* and 15*b* is grounded. The other end of the ballast component 34 is connected with a CCFL 32 and a balanced inductor 36 in order. One end of the balanced inductor 36 is connected to a PWM controller 201 of a drive circuit 20. The above balanced inductor 36 can be moved to be between the ballast component 34 and the CCFL 32. Meanwhile, the other end of the CCFL 32 is connected to the PWM controller 201 of the drive circuit 20. The balanced inductor 36 can also compensate the capacitance impedance of the CCFL 32. A brightness controller 80 is connected to the PWM controller 201, and outputs a voltage or a digital signal to control the PWM controller 201 for changing the brightness of the CCFL 32. Other components and connection ways are the same as those in FIG. 4.

The operation principle of the circuit shown in FIG. 6 is the sane as that in FIG. 4 and thus won't be further described below.

As shown in FIG. 6, when the secondary coil 15 of the transformer 10 is short circuited due to some factors, a very large short circuit current will be instantaneously generated in the secondary coil 15. This short circuit current will generate a very large counter magnetic flux in the second side column 16. This counter magnetic flux will flow to the central column 18 and then back to the second side column 16 due to the magnetic flux on the first side column 14. Therefore, this counter magnetic flux won't generate a very large counter magnetomotive force on the primary coil 13 to burn out the primary coil 13. Moreover, the power conversion action of the primary coil 13 on the first side column 14 won't be affected, and the protection function for the transformer 10 during short circuit can also be accomplished.

Figure 7A:
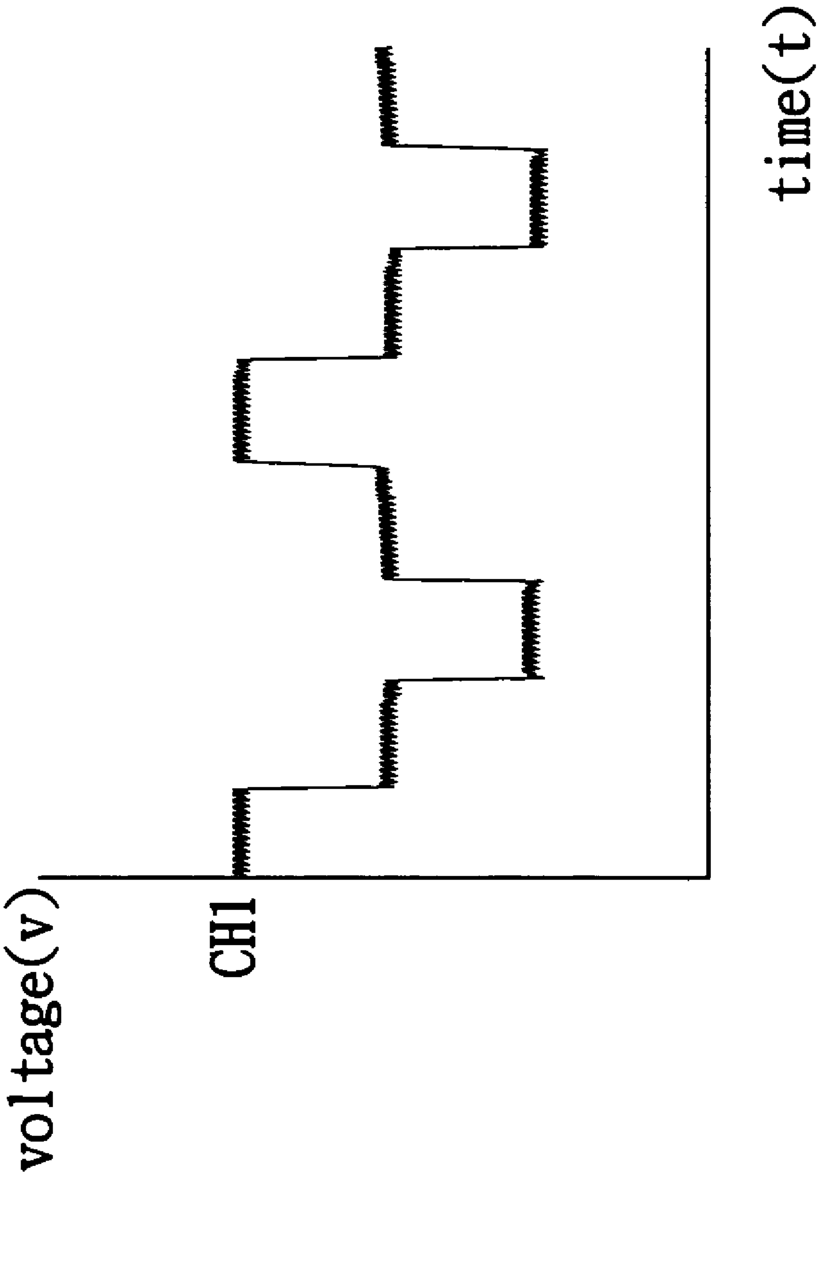
FIG. 7A shows a voltage waveform across two ends of the primary coil of a normally functioning transformer of a multilamp drive device according to the first embodiment of the present invention.

FIG. 7A shows a measured voltage waveform (first waveform CH1) across the two ends of the primary coil 13 generated by the drive circuit 20 when the transformer 10 operates normally. This voltage is used to drive the CCFL 32 connected at the secondary coil 15.

Figure 7B:
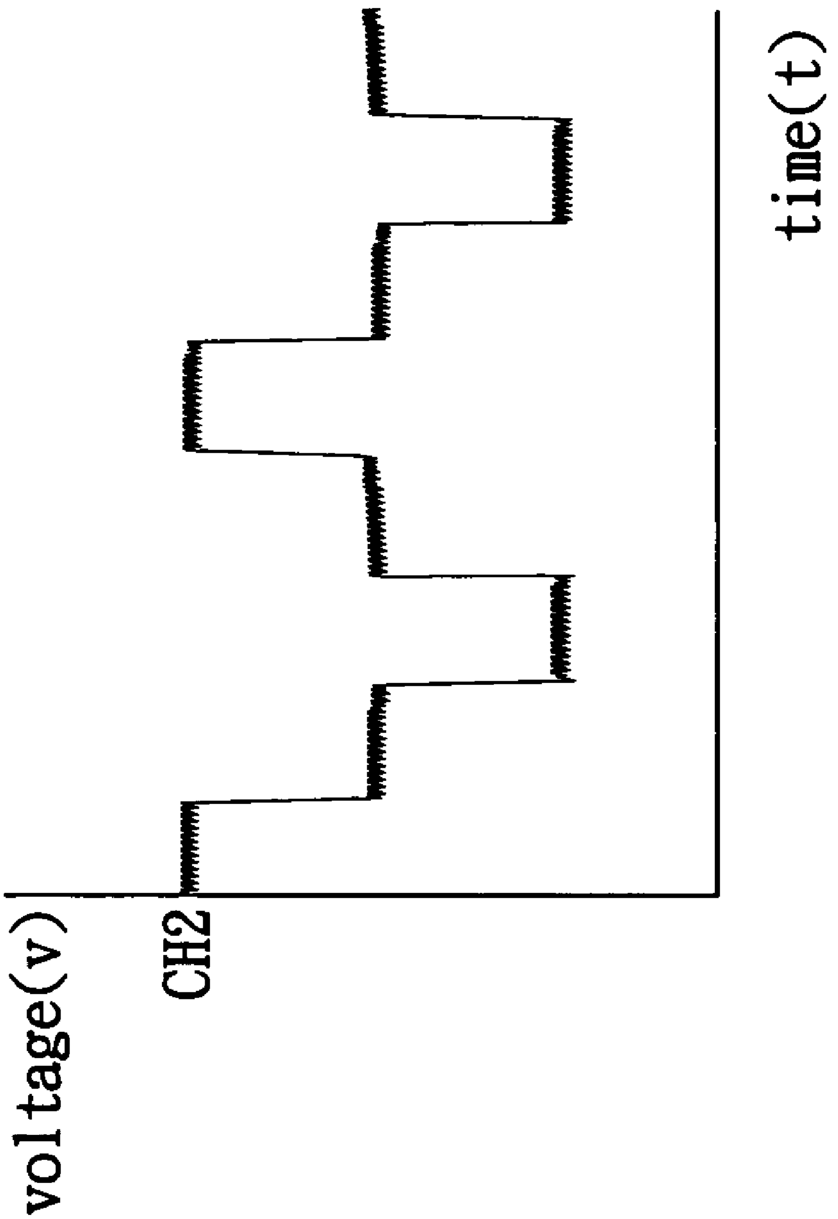
FIG. 7B shows a voltage waveforms across two ends of the primary coil of a transformer of a multi-lamp drive device according to the first embodiment of the present invention when the secondary coil of the transformer is short-circuited.

FIG. 7B shows a measured voltage waveform (second waveform CH2) across the two ends of the primary coil 13 of a transformer 10 when the secondary coil 15 of the transformer 10 is short-circuited.

From FIGS. 7A and 7B, one can know that the voltage measured at the two ends of the primary coil 13 won't be affected by the short circuit current when the secondary coil 15 of the transformer 10 is short-circuited.

Figure 8:
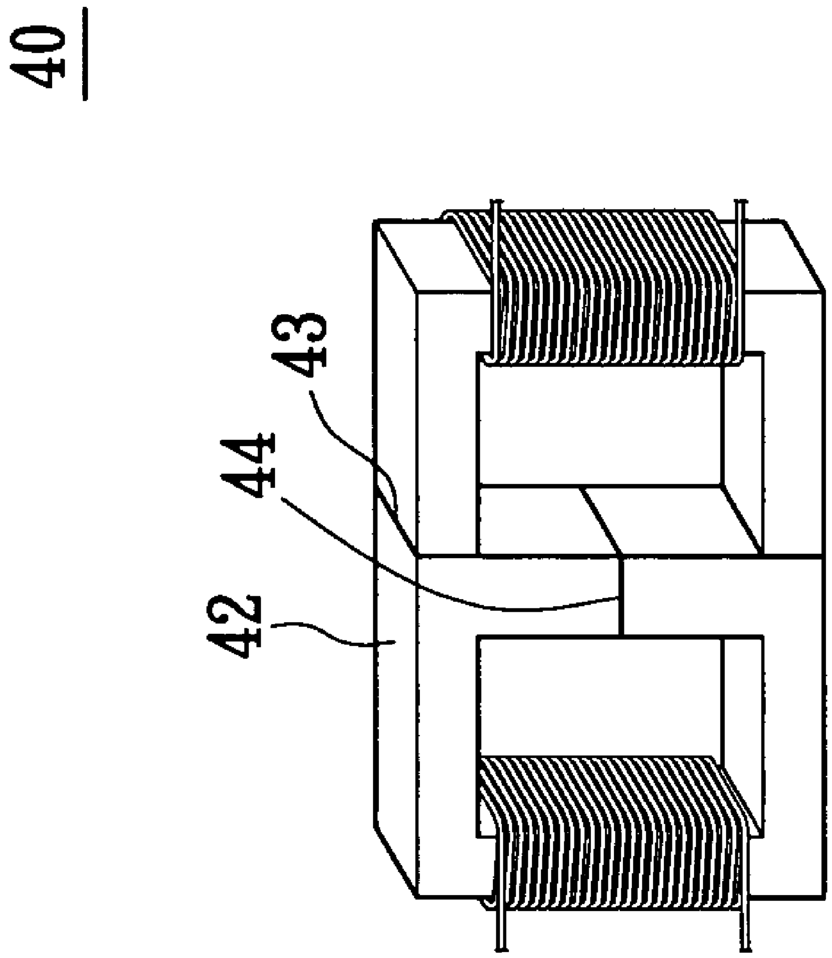
FIG. 8 is a perspective view of a transformer of a multi-lamp drive device according to a second embodiment of the present invention.

Please refer to FIG. 8. a magnetic core 42 of a transformer differs from the magnetic core 12 of the transformer 10 (shown in FIG. 3) in a first magnetic gap 43 and a second magnetic gap 44. The first magnetic gap 43 and the second magnetic gap 44 of the transformer 40 are connection points for assembly of the magnetic core 42. The transformer 40 is the same as the transformer 10 in the operation principle and characteristics.

As shown in FIG. 8, the magnetic core 42 of the transformer 40 can be composed of two inverse U-shaped magnetic cores and two L-shaped magnetic cores. If the magnetic core 42 has more than two central columns, the magnetic core 42 can be assembled by magnetic cores of various letters according to its shape.

To sum up, by arranging the positions on the magnetic core 12 of the primary coil 13 and the secondary coil 15 of the transformer 10 and with the help of the central column 18 on the magnetic core 12, the multi-lamp drive device of the present invention can guide the counter magnetic flux generated by the load current not to affect the power conversion action of the primary coil 13. Heat generated by the transformer due to a too large load current can also be reduced. Moreover, the protection effect for the transformer during short circuit can be accomplished.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. A multi-lamp drive device connected with a power source for driving at least a lamp, comprising:

a drive circuit comprising a pulse width modulation controller for outputting a modulation signal and a converter connected to said pulse width modulation controller for forming an output excitation power source based on said power source;

a transformer comprising a magnetic core, a primary coil and a secondary coil, said magnetic core having a first side column, a second side column and at least a central column between said first and second side columns, said second side column being magnetically coupled to said first side column through a first magnetic gap and said central column having a second magnetic gap formed therein, said primary coil being wound around said first side column and electrically coupled with said output excitation power source, said secondary coil being wound around said second side column and electrically coupled with one end of at least a ballast component, the other end of said ballast component being connected to a first end of at least a balanced inductor; and at least a lamp whose one end is connected to a second end of said balanced inductor and whose other end is connected to said drive circuit.

2. The multi-lamp drive device as claimed in claim 1, wherein said lamp is a cold cathode fluorescent lamp.

3. The multi-lamp drive device as claimed in claim 1, wherein said ballast component is a capacitor having a relatively higher impedance.

4. The multi-lamp drive device as claimed in claim 1, wherein said balanced inductor is a winding coil of a balanced transformer.

5. A multi-lamp drive device connected with a power source for driving at least a lamp, comprising:

a drive circuit comprising a pulse width modulation controller for outputting a modulation signal and a converter connected to said pulse width modulation controller for forming an output excitation power source based on said power source;

a transformer comprising a magnetic core, a primary coil and a second coil, said magnetic core having a first side column, a second side column and at least a central column between said first and second side columns, said second side column being magnetically coupled to said first side column through a first magnetic gap and said central column having a second magnetic gap formed therein, said primary coil being wound around said first side column and electrically coupled with said output excitation power source, said secondary coil being wound around said second side column and electrically coupled with one end of at least a ballast component, the other end of said ballast component being connected to a first end of at least a lamp; and at least a balanced inductor whose one end is connected to a second end of said lamp and whose other end is connected to said drive circuit.

6. The multi-lamp drive device as claimed in claim 5, wherein said lamp is a cold cathode fluorescent lamp.

7. The multi-lamp drive device as claimed in claim 5, wherein said ballast component is a capacitor having a relatively higher impedance.

8. The multi-lamp drive device as claimed in claim 5, wherein said balanced inductor is a winding coil of a balanced transformer.

9. A multi-lamp drive device connected with a power source for driving at least a lamp, comprising:

a drive circuit comprising a pulse width modulation controller for outputting a modulation signal and a converter connected to said pulse width modulation controller for forming an output excitation power source based on said power source;

a transformer comprising a magnetic core, a primary coil and a secondary coil, said magnetic core having a first side column, a second side column and at least a central column between said first and second side columns, said second side column being magnetically coupled to said first side column through a first magnetic gap and said central column having a second magnetic gap forming therein, said primary coil being wound around said first side column and electrically coupled with said output excitation power source, said secondary coil being wound around said second side column, one end of said secondary coil being electrically coupled with one end of at least a ballast component, the other end of said secondary coil being grounded, the other end of said ballast component being connected to a first end of at least a lamp; and at least a balanced inductor whose one end is connected to a second end of said lamp and whose other end is connected to said drive circuit.

10. The multi-lamp drive device as claimed in claim 9, wherein said lamp is a cold cathode fluorescent lamp.

11. The multi-lamp drive device as claimed in claim 9, wherein said ballast component is a capacitor having a relatively higher impedance.

12. The multi-lamp drive device as claimed in claim 9, wherein said balanced inductor is a winding coil of a balanced transformer.

13. A multi-lamp drive device connected with a power source for driving at least a lamp, comprising:

a drive circuit comprising a pulse width modulation controller for outputting a modulation signal and a converter connected to said pulse width modulation controller for forming an output excitation power source based on said power source;

a transformer comprising a magnetic core, a primary coil and a secondary coil, said magnetic core having a first side column, a second side column and at least a central column between said first and second side columns, said second side column being magnetically coupled to said first side column through a first magnetic gap and said central column having a second magnetic gap formed therein, said primary coil being wound around said first side column and electrically coupled with said output excitation power source, said secondary coil being wound around said second side column, one end of said secondary coil being electrically coupled with one end of at least a ballast component, the other end of said secondary coil being grounded, the other end of said ballast component being connected to a first end of at least a balanced inductor; and at least a lamp whose one end is connected to a second end of said balanced inductor and whose other end is connected to said drive circuit.

14. The multi-lamp drive device as claimed in claim 13, wherein said lamp is a cold cathode fluorescent lamp.

15. The multi-lamp drive device as claimed in claim 13, wherein said ballast component is a capacitor having a relatively higher impedance.

16. The multi-lamp drive device as claimed in claim 13, wherein said balanced inductor is a winding coil of a balanced transformer.

* * * * *